United States Patent
Poutous et al.

(10) Patent No.: US 12,360,432 B2
(45) Date of Patent: Jul. 15, 2025

(54) NON-LINEAR OPTICAL CRYSTAL WITH ANTI-REFLECTIVE NANOSTRUCTURED SURFACE

(71) Applicants: GAMDAN Optics Inc., San Jose, CA (US); University of North Carolina at Charlotte, Charlotte, NC (US)

(72) Inventors: Menelaos K Poutous, Harrisburg, NC (US); Hui Cai, San Jose, CA (US); Praneeth Gadamsetti, Charlotte, NC (US)

(73) Assignees: GAMDAN OPTICS, INC., San Jose, CA (US); THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 1057 days.

(21) Appl. No.: 17/344,881

(22) Filed: Jun. 10, 2021

(65) Prior Publication Data

US 2022/0004080 A1    Jan. 6, 2022

Related U.S. Application Data

(60) Provisional application No. 63/037,209, filed on Jun. 10, 2020.

(51) Int. Cl.
   G02F 1/355     (2006.01)
   C01B 35/12     (2006.01)

(52) U.S. Cl.
   CPC .......... G02F 1/3551 (2013.01); C01B 35/121 (2013.01); *C01P 2002/85* (2013.01); *C01P 2006/60* (2013.01)

(58) Field of Classification Search
   CPC ... G02F 1/3551; C01B 35/121; C01P 2006/60
   See application file for complete search history.

(56) References Cited

U.S. PATENT DOCUMENTS 5,368,782 A * 11/1994 Gotoh ............... C30B 7/00
                                                    252/582
2013/0136894 A1  5/2013 Baker et al.
(Continued)

FOREIGN PATENT DOCUMENTS

| CN | 106435487 A | 2/2017 |
| CN | 110230096 | 9/2019 |
| CN | 111244744 | 5/2020 |

OTHER PUBLICATIONS

International Preliminary Report on Patentability, Application No. PCT/US2021/036888, Gamdan Optics Inc., mailed Dec. 22, 2022.
(Continued)

*Primary Examiner* — Laura A Auer
(74) *Attorney, Agent, or Firm* — Fountainhead Law Group, PC

(57) ABSTRACT

A non-linear optical crystal, such as a Lithium triborate ($LiB_3O_5$ or LBO) crystal, includes a first nanostructured optical surface including distributed pillars and gaps having random heights and cross sections to provide anti-reflection control and scatter control of first light incident on the first structured optical surface. The LBO crystal has an anti-reflective random structured optical surface formed by selective substitution of the surface species Boron-pentoxide ($B_3O_5^-$) by Lithium Fluoride (LiF), resulting in a depletion layer with low reflectivity and low reflective scatter in the visible, ultraviolet (UV), and near infrared (IR) bands. The LBO crystal with the anti-reflective structured optical surface may be a monolithic structure and thus need not include a coating of an anti-reflective (AR) material, although the LBO crystal may include an optical surface coated by an AR material. The pillars and gaps may be randomly distributed or periodically distributed on the optical surface.

32 Claims, 16 Drawing Sheets

(56) References Cited

U.S. PATENT DOCUMENTS

2014/0002891 A1\* 1/2014 Kondo .................. G02F 1/3534
359/326
2020/0057356 A1 2/2020 Maker et al.
2020/0319377 A1\* 10/2020 Kikuchi ................. G02B 1/118

OTHER PUBLICATIONS

International Search Report for PCT Application No. PCT/US2021/036888, dated Sep. 28, 2021, 4 pages.
International Written Opinion for PCT Application No. PCT/US2021/036888, dated Sep. 28, 2021, 5 pages.

\* cited by examiner

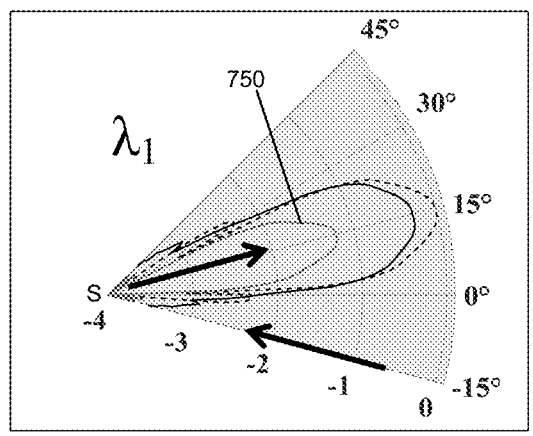 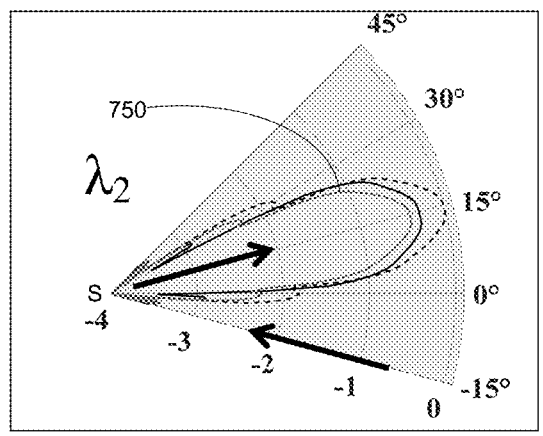
*Fig. 7A*          *Fig. 7B*

NON-LINEAR OPTICAL CRYSTAL WITH ANTI-REFLECTIVE NANOSTRUCTURED SURFACE

GOVERNMENT RIGHTS

This invention was made with government support under contract 1840843 awarded by the National Science Foundation (NSF). The government has certain rights in the invention.

BACKGROUND

Lithium triborate ($LiB_3O_5$ or LBO) is a non-linear optical crystal used for frequency up-conversion of laser radiation and is typically used for second and third harmonic generation through two or three photon absorption. LBO crystals can be used for continuous wave (CW) or pulsed wave applications as the frequency conversion material in optical parametric oscillators. An LBO crystal has an entry facet and an exit facet and reflective losses of optical signals at these facets reduce the efficiency and increase the required power in optical systems utilizing such crystals. To mitigate these losses, conventional anti-reflective (AR) coatings are typically applied on both facets to suppress Fresnel reflectivity. These AR coatings are typically deposited as layered structures or as a single layer anti-reflection (SLAR) coating such as magnesium fluoride $MgF_2$. Two layer anti-reflection coatings or V-coatings, and alternating multi-layer structures, are referred to as narrow- and broadband AR coatings, respectively. The materials of these coatings, such as silica, alumina, and similar inert oxides, are not chemically comparable to the LBO crystal on which the coatings are deposited. These AR coatings may be deposited through various methods such as: magnetron sputtering, physical vapor thermal deposition, ion-beam directed sputtering, electron-beam physical vapor deposition, and reactive atomic layer deposition. Defects can result in the layered AR coatings due to the different chemical properties of the materials of the coatings, compared to the LBO crystal, as well as, during the fabrication process of the coatings themselves. The defects in the AR coatings may result in unwanted light scattering, as well as high-power light sensitivity which can result in catastrophic damage to the coatings and LBO crystal in the form of fractures that render the coated LBO crystal inoperable. There is accordingly a need for improved LBO crystals and methods of fabricating such LBO crystals for optical systems.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions.

FIGS. 7A and 7B are diagrams showing measured directional reflected scatter at two different wavelengths from an optical surface including randomly structured nanostructures.

DETAILED DESCRIPTION

Described herein are techniques for non-linear optical crystals. In the following description, for purposes of explanation, numerous examples and specific details are set forth in order to provide a thorough understanding of some embodiments. Embodiments covered by the claims may include some or all of the features in these examples embodiments alone or in combination with other features described below and may further include modifications and equivalents of the features and concepts described herein.

In embodiments of the present disclosure, an LBO crystal has an anti-reflective random structured optical surface formed by selective substitution of the surface species Boron-pentoxide ($B_3O_5^-$) by Lithium Fluoride (LiF), resulting in a depletion layer with low reflectivity and low reflective scatter in the visible, ultraviolet (UV), and near infrared (IR) bands of the light spectrum. Thus, the LBO crystal is suitable for utilization in optical systems in the IR to green ($\lambda$=550 nm), IR to UV, and UV ranges of the optical spectrum. Transmission performance of the LBO crystal, across the band of applications from the UV spectrum to the IR spectrum (300 nm to 1100 nm wavelength), is polarization and angle-of-incidence insensitive and the structured optical surface also enhances resistance to catastrophic or ballistic laser damage. The LBO crystal with the anti-reflective random structured optical surface may be a monolithic structure, for example, and thus in embodiments the LBO crystal does not include deposited coatings of AR material on the LBO crystal. In embodiments of the LBO crystal, the anti-reflective random structured optical surface has a longitudinal roughness (depth or gaps) with an effective gradient index profile to provide anti-reflective control and has transverse random features (rods or pillars) having nano-scale size distributions to provide scatter control, as will be described in more detail below. In further embodiments the LBO crystal includes a diffuse boundary region that is depleted of Boron B and enriched with Lithium Fluoride LiF, resulting in additive transmission enhancement properties, as will also be described in more detail below.

Figure 1:
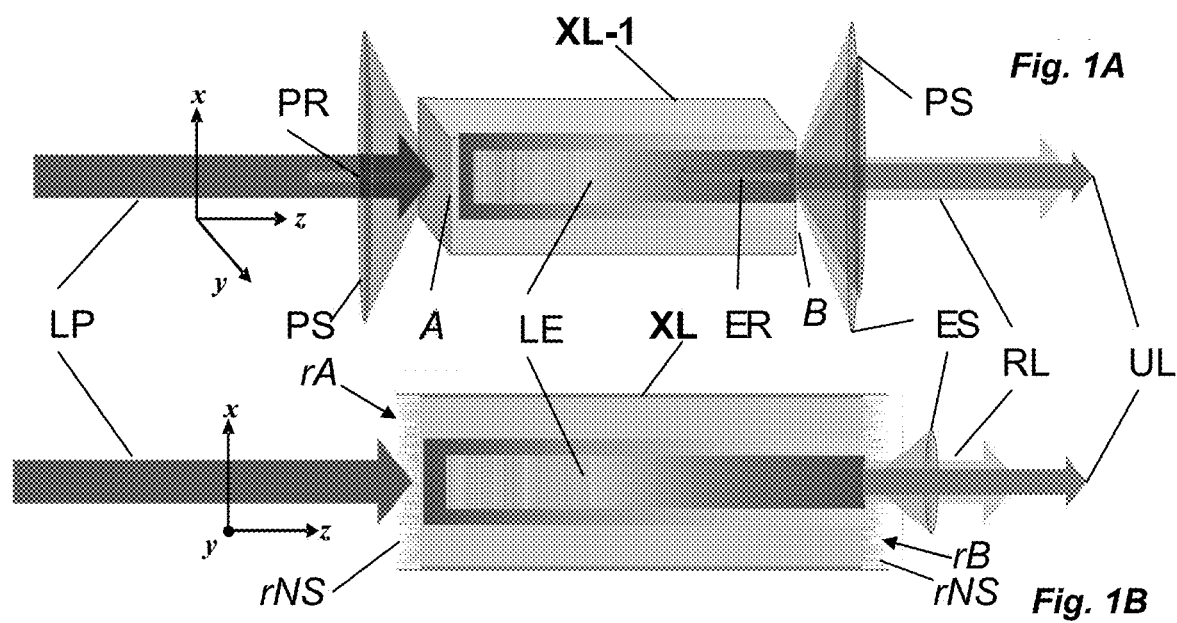
FIG. 1A is cross-sectional view of an LBO crystal being optically pumped by external laser light.
FIG. 1B is a cross-sectional view of an LBO crystal having a laser pump entry facet and exit facet including random nanostructures according to an embodiment of the present disclosure.

LBO crystals may be pumped coaxially by an infrared laser (pump), which may operate near a wavelength of 1060 nm or 1030 nm, for example. "Pumping" is a process by which light from the infrared laser is used to raise or "pump" electrons of atoms in the LBO crystal from a lower energy level to a higher energy level, as will be understood by those skilled in the art. A representative schematic of an LBO crystal XL-1 being optically pumped by laser pump light LP is shown in FIG. 1A, which shows a cross-sectional view of the LBO crystal. The pump light LP enters the LBO crystal XL-1 through an entry facet A of the crystal and propagates through the crystal where this light is partially absorbed by non-linear processes that causes emitted light LE of a shorter wavelength, in the UV or visible range of the spectrum, to be emitted in all directions inside the crystal. The emitted light LE propagates along an optical axis of the LBO crystal XL-1, where the optical axis corresponds to the Z-axis in the example of FIG. 1. The emitted light LE is confined within the LBO crystal XL-1 and exits from an exit facet B of the crystal as emitted light UL. Thus, the emitted light UL exits the exit facet B along with residual laser pump light RL corresponding to laser pump light LP that has propagated through the LBO crystal XL and not been absorbed by the crystal.

The incident laser pump light LP suffers Fresnel reflection at the entry facet A due to the abrupt change of the index of refraction from ambient (i.e., air) to the index of refraction value of the LBO crystal XL-1. This Fresnel reflection causes a portion of the laser pump light LP to be reflected at the entry facet A, resulting in reflected laser pump light PR at the entry facet. Surface defects and micro-abrasions or scratches in the entry facet A may also cause light scatter of the laser pump light LP at the entry facet A, resulting in scattered laser pump light PS. At the exit facet B, there is also Fresnel reflection and possible light scatter of the residual laser pump light RL that has propagated through the LBO crystal XL-1. In addition, there is Fresnel reflection and possible light scatter of the emitted shorter wavelength emitted light LE generated inside the LBO crystal XL-1 and propagating along the Z-axis of the crystal, resulting in reflected shorter wavelength light ER and scattered shorter wavelength light ES at the exit facet B.

Ideally, all the incident laser pump light LP would enter the LBO crystal XL-1 through the entry facet A to cause emitted light LE to be generated inside the LBO crystal XL-1, and this shorter wavelength emitted light would then propagate along the Z-axis towards the exit facet B and be output as emitted light UL. Instead, the reflection and scattering at the exit and entry facets A, B as described above result in undesirable losses in the operation of the LBO crystal XL-1 in providing emitted light UL at a shorter wavelength. As mentioned above, AR coatings are typically applied to the entry and exit facets A, B to suppress Fresnel reflectivity on both facets and possibly for both wavelengths of light. These AR coatings are deposited as layered structures from materials that are not chemically comparable to the LBO crystal XL-1, such as silica, alumina, or similar inert oxides, as mentioned above. The AR coating may be a single or multi-layer structure (SLAR, V-coating, BBAR) that provides a minimum reflectance at a specific wavelength or alternating layer type AR coating that provides broadband anti-reflection characteristics. As mentioned above, the AR coatings may have defects that may result in light scattering and a high-power light sensitivity, resulting in catastrophic damage in the form of fractures in the AR coating that render the coated LBO crystal inoperable.

Embodiments of the present disclosure reduce the reflective and scattering losses at one, or both, of the entry and exit facets of an LBO crystal, or other type of non-linear optical crystal, by introducing a diffuse boundary at the facets. The diffuse boundary is fabricated by removal of the original material of the facets and texturing the surfaces of the facets with randomly distributed pillars and gaps, of random heights and cross sections, thus creating an anti-reflective random structured optical surface, as will be described in more detail below.

FIG. 1B shows a cross-sectional view of an LBO crystal XL having a laser pump entry facet rA and exit facet rB that are randomly nano-textured to suppress reflectivity and scattering of laser pump light and emitted light of a shorter wavelength according to an embodiment of the present disclosure. In the embodiment illustrated in FIG. 1B, each of the facets rA, rB includes random nanostructures rNS. In the embodiment of FIG. 1B, the random nanostructures rNS of the facets rA, rB extend normal or orthogonal to the XY-plane, namely parallel the Z-axis. In one embodiment, the random nanostructures rNS are fabricated using a reactive plasma etching process, or similar techniques, that selectively removes Boron (B) from the surface of the LBO crystal XL by forming volatile compounds under vacuum while Lithium (Li) forms a non-volatile residual (LiF) in combination with the etching plasma active species (Fluorine). This will be described in more detail below with reference to FIGS. 9A and 9B. The Fresnel reflectivity reduction due to the random nanostructures rNS results from the equivalence of a diffuse boundary to a gradient optical index region for both the entry facet rA and exit facet rB. This gradient optical index region is conceptually modelled as a gradual, slow transition of the refractive index value from air (index=1) to the refractive index of the LBO crystal XL, which is an index value between 1.56 and 1.62 for wavelengths between 1060 nm (IR) and 300 nm (UV).

Figure 2:
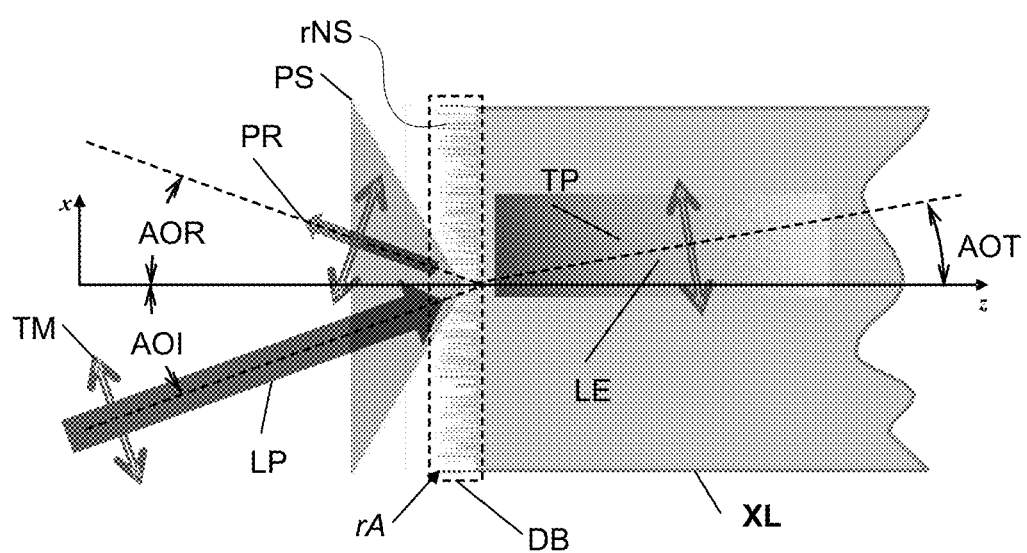
FIG. 2 is a schematic representation illustrating the interaction between incident laser pump light and the entry facet including random nanostructures of FIG. 1B.

FIG. 2 is a schematic representation of the interaction between incident laser pump light LP, which may have a linear polarization state shown as transverse magnetic (TM) polarization, and the random nanostructures rNS of the entry facet rA of the LBO crystal XL of FIG. 1B. In FIG. 2, the boundary provided by random nanostructures rNS of the entry facet rA is labeled as a randomly nanostructured diffuse boundary DB. The term "random nanostructures rNS" as used herein corresponds to the islands or pillars and the voids or gaps formed on a facet of an LBO crystal. These random nanostructures rNS have several characteristics that are "random." Specifically, the arrangement or distribution of the pillars and gaps of the random nanostructures rNS are randomly arranged or distributed on the optical surface or facet of the LBO crystal. In addition, the heights and cross-sections of the pillars and gaps forming the nanostructures are random, meaning the heights and cross-sections of the pillars have random values and the cross-sections and depths of the gaps between pillars have random values.

In FIG. 2, the laser pump light LP is incident on the diffuse boundary DB at an angle AOI in the XZ-plane and suppressed reflected light PR results and is directed at an angle AOR, where AOR=AOI. The laser pump light LP that enters the LBO crystal XL, which is designated as transmitted laser pump light TP in FIG. 2, propagates through the LBO crystal XL at an angle AOT defined by Snell's law of refraction. For an incident angle AOI of the laser pump light LP of less than 40 degrees, the polarization state of the reflected laser pump light PR and transmitted laser pump light TP are not altered for most dielectric materials, such as this LBO crystal. The transmitted laser pump light TP propagates through the LBO crystal XL and towards the exit facet rB (not shown in FIG. 2; see FIG. 1B). The randomly nanostructured diffuse boundary DB have a limited scatter profile in the reflected direction (i.e., in the direction along the Z-axis in the negative direction (from right to left) in FIG. 2). The enhanced power transmission of the laser pump light LP through the entry facet rA is angle-of-incidence (AOI) and polarization insensitive based on the nano-structuring statistics of the surface of the entry facet. These nano-structuring statistics characterize the arrangement and features of the random nanostructures rNS of the entry facet rA.

Figure 3:
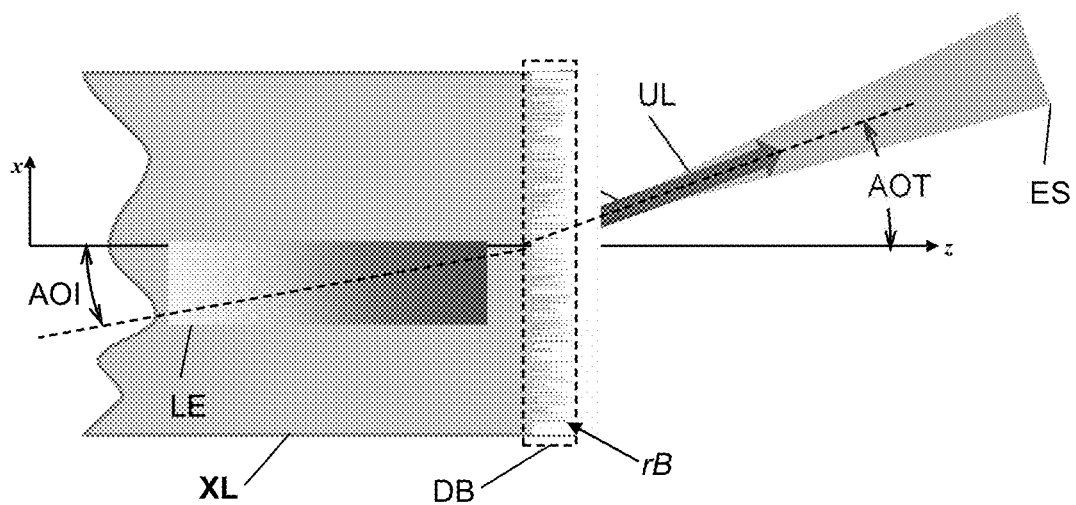
FIG. 3 is a schematic representation illustrating the interaction between light and the exit facet including random nanostructures of FIG. 1B.

A similar situation is depicted in FIG. 3, which shows the exit facet rB interaction with the emitted, and frequency up-converted, light LE. The laser pump light LP has been omitted in FIG. 3 for clarity. The emitted light LE is incident upon the exit facet rB at an angle AOI in the XZ-plane. The Fresnel reflectivity is suppressed again at the exit facet rB by the diffuse boundary DB, namely by the random structured optical surface formed by the random nanostructures rNS of the exit facet. In addition, the diffuse boundary DB of the exit facet rB may result in reduced transmissive scatter ES of the emitted light UL. This possible scatter at the exit facet rB is highly directional along the direction of propagation of the frequency up-converted light LE, which is along the directed defined by angle AOT in the example of FIG. 3.

In the embodiment of FIGS. 2 and 3, both the entry facet rA and exit facet rB are shown as being planar surfaces having the random nanostructures formed thereon. In further embodiments, the surface of each of the entry facet rA and exit facet rB may be a curved or wedged surface having the random nanostructures formed thereon, as will be described in more detail below with reference to FIG. 10.

Figure 4:
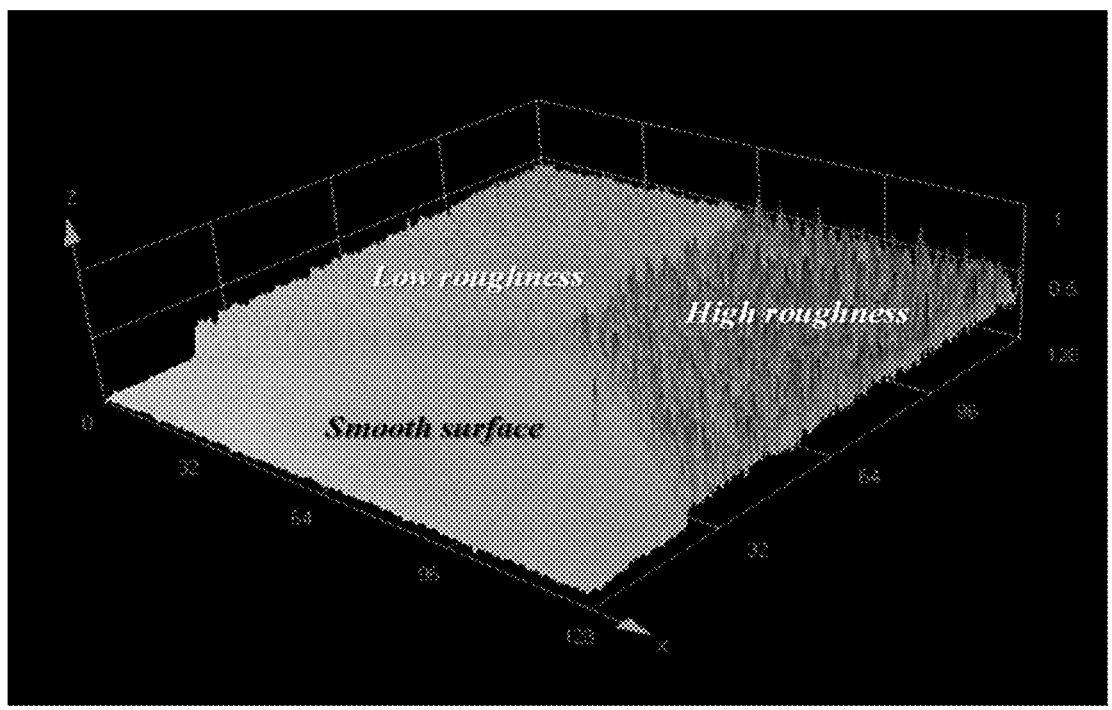
FIG. 4 is a three-dimensional illustration of random nanostructures having different roughness levels arranged on a surface or facet of a crystal according to embodiments of the present disclosure.

The diffuse boundary DB formed by the random nanostructures rNS has specific characteristic scales as illustrated in FIG. 4, which shows measured data from a confocal microscope for the scales of three adjacent nanostructured optical surfaces: smooth, low roughness and high roughness. Accordingly, the scale of the nanostructured optical surface defines a level of roughness of the surface. All surfaces have been etched using the aforementioned reactive plasma vacuum processes in the illustrated embodiment. A smooth optical surface is free of roughness, although it may have polishing and/or latent scratches and digs. A rough optical surface consists of narrow and tall pillars, packed at some quantifiable density value, with no repeatable height pattern or cross-sectional periodic size scale (i.e., random or pseudo-random heights and cross-sections). A low roughness optical surface has an average pillar height, namely a root-mean-square (RMS) pillar height value, less than 1/10 of the wavelength of incident light and a peak-to-valley height less than 1/2 of the incident light wavelength value. A high roughness optical surface has an average pillar height (RMS value) greater than 1/5 of the wavelength of incident light and a peak-to-valley height equal or greater than the wavelength of incident light.

With reference to FIG. 4, note that the nanostructured optical surface of a facet of an LBO crystal according to embodiments of the present disclosure would not include all three of the different scales of roughness illustrated in FIG. 4. FIG. 4 merely shows, on a single optical surface, different scales of roughness for the optical surface that may be utilized in different embodiments of the present disclosure.

Figures 5A, 5B:
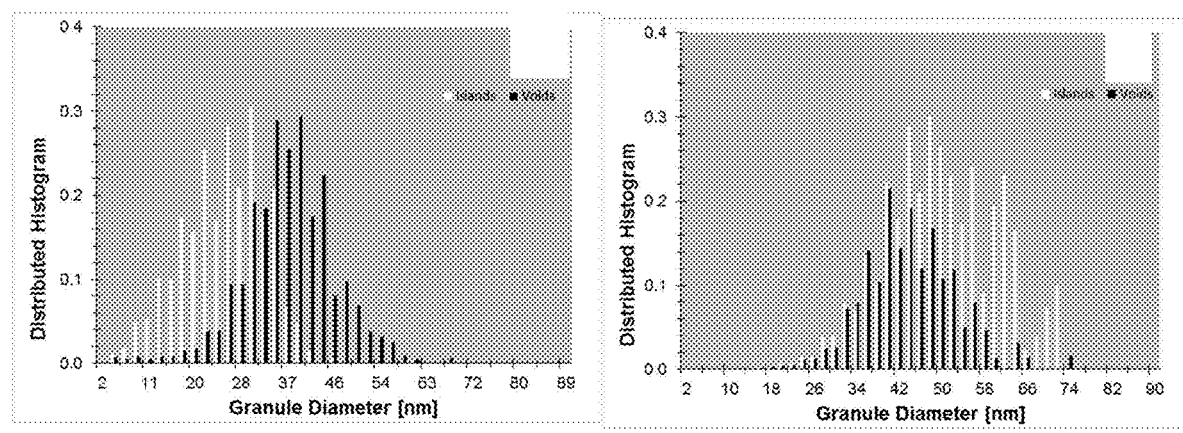
FIGS. 5A and 5B are histograms showing cross-sectional size values of between sparsely and densely randomly distributed populations of pillars or nanostructures on a crystal surface according to embodiments.

FIGS. 5A and 5B are two histograms of cross-sectional size values between sparsely and densely distributed random populations of pillars in embodiments of the present disclosure. The pillar structures are formed by the LBO crystal material left in place (i.e., not etched) as indicated by the population of islands (i.e., pillars) in the figure. The voids (i.e., air gaps) are the locations where the LBO material of the LBO crystal XL was removed. The pillar transverse dimensions are quantified as follows. A pillar has the geometrical shape of a truncated cone and may be randomly intersected by neighboring pillars due to the dense packing, at random heights. Viewing the random structure of pillars or islands and gaps or voids from the top-down, one can see only the circular cross sections of the pillars, at the respective intersected heights. Therefore, the structure appears as a collection of random circular islands or voids. Each island (or void) has a measurable diameter.

FIG. 5A shows a total feature population (i.e., islands (pillars) and voids (gaps)) that is void-dominated and accordingly has a sparse island distribution. The populations of islands and voids have cross sectional diameters less than 1/10 of a 1.06 µm wavelength of laser pump light in the example of FIG. 5A. FIG. 5B shows a mean diameter and total population as island-dominated, indicating a dense pillar distribution, with both populations having cross sectional diameters less than 1/10 of a 1.06 µm wavelength of laser pump light. Both surfaces have anti-reflective (AR) performance over a wide range in the visible and infrared spectrum while their scattering characteristics differ for incident light wavelengths shorter than 400 nm. These random population statistical distributions of islands and voids in FIGS. 5A and 5B affect the angle of incidence anti-reflective performance and polarization sensitivity of the diffuse boundary DB including these pillars and voids. The dense pillar structure of FIG. 5B has better reflectivity suppression characteristics and a wider range of polarization insensitive incidence angles of operation.

Figure 6:
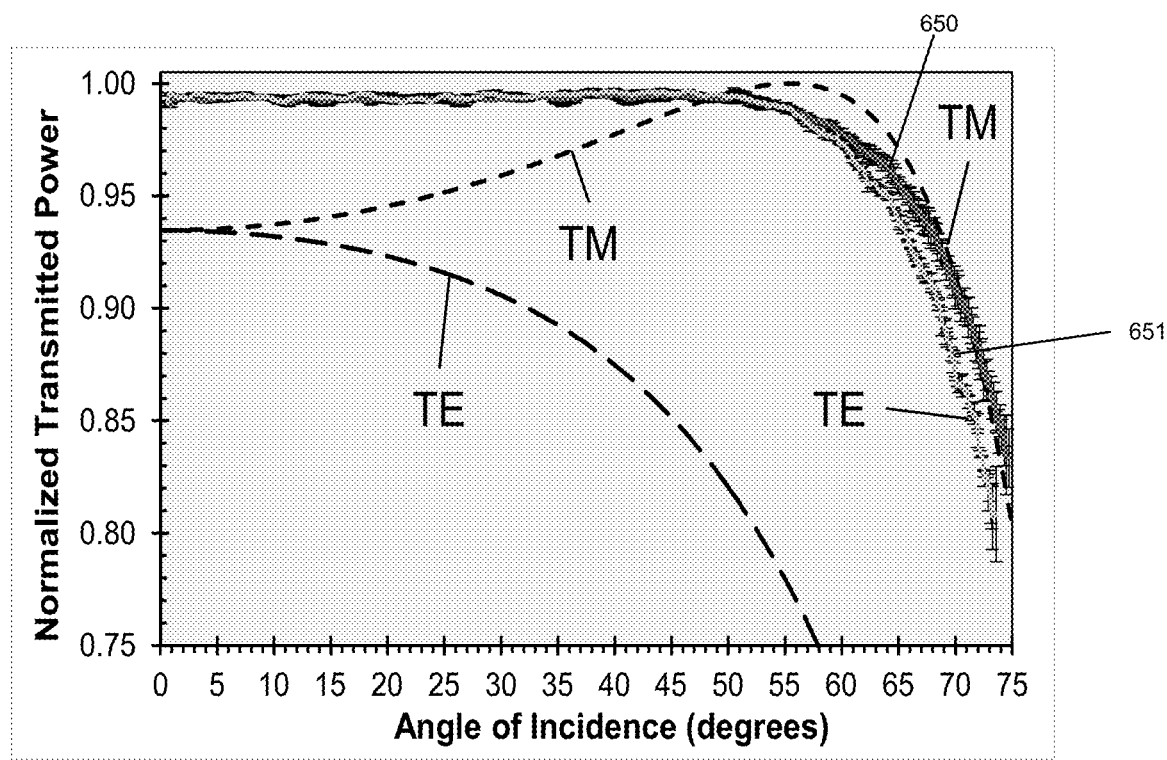
FIG. 6 is a graph illustrating normalized transmitted power as a function of angle of incidence of light for an optical crystal having randomly distributed nanostructured pillars with a dense population formed on both the entry and exit facets of the crystal.

FIG. 6 is a graph illustrating normalized transmitted power as a function of angle of incidence of light for an optical crystal substrate having randomly distributed nanostructured pillars with a dense population formed on both the entry and exit facets of the crystal. The polarization insensitive performance for an optical crystal substrate with both entry and exit facets randomly nanostructured with a dense pillar population is shown by FIG. 6. The dashed curves are the performance of the optical crystal substrate with both entry and exit facets optically polished, with transmission less than 100% (1.00) due to Fresnel reflectivity at both surfaces. The lines 650 and 651 show transmission of 99.5% for angles of incidence up to approximately 50 degrees, resulting in a non-polarized dependent performance.

FIG. 6 illustrates a fundamental difference between the random nanostructured optical surface diffuse boundary DB according to embodiments of the present disclosure and conventional layered thin film deposited anti-reflection coatings. Conventional AR coatings may have performance which is angle-of-incidence dependent as to the amount of reflectance suppression and to incident light-polarization states, especially if the AR coatings are SLAR or V-coating type structures. The incident light polarization states are shown as transverse electric (TE) and transverse magnetic (TM). Ordered nanostructured optical surfaces, such as subwavelength grating structures, have high polarization sensitivity with respect to incidence angles, due to the periodicity of their nanostructures. At high angles-of-incidence, subwavelength gratings may also allow the propagation of higher diffraction orders (i.e., other than zero), an effect that may be absent from the randomly nanostructured surfaces according to embodiments of the present disclosure.

Although ordered nanostructured optical surfaces have high polarization sensitivity with respect to incidence angles, embodiments of the present disclosure include non-linear crystals including nanostructured optical surfaces in which at least one of the nanostructured optical surfaces of the crystal has periodic nanostructures formed on the surface, as will be discussed in more detail below with reference to FIG. 11. In embodiments, a first optical surface of the crystal includes randomly distributed nanostructures while a second optical surface includes periodically distributed nanostructures. In further embodiments, one optical surface of the non-linear crystal includes randomly distributed nanostructures while a second optical surface of the crystal includes and AR coating.

Randomly nanostructured optical surfaces may also have directional scatter suppression performance as well. FIGS. 7A and 7B show measured directional reflected scatter from a randomly structured anti-reflective optical surface at two different test wavelengths $\lambda_1$ and $\lambda_2$. The randomly structured anti-reflective optical surface was tested using a laser beam incident at 15-degrees tilt to the surface, and the scatter is measured over a 60-degree angle of collection (from −15-degrees to +45-degrees.) The incident wavelength is equal to the random structure depth and the features (islands and voids) are less than $1/10$ of the wavelength value for FIG. 7A. The incident and reflected light directions are shown by arrows in the figures. The radial scale is logarithmic base 10, meaning that the highest value is normalized to unity (100%) at the center of the pattern, and the measured values are all below that by factors of 10. The optical surface is located at the center of the angular segment S.

The light reflected by a perfect mirror is shown as the black dashed line. This shows perfect reflection on-axis (+15-degrees), and a directional laser beam flare of ±10-degrees. The light of the optical quality polished substrate is shown as the solid black line. The axial centerline power is lower, as the sample is mostly transmissive, and the directional flare of the reflected beam is wider than the mirror's due to the exit facet reflection by the substrate. The randomly structured anti-reflective surface is shown as the gray solid line 750. The on-axis power is reduced by a factor of 10 and the flare is "squeezed" to levels comparable to the mirror, indicating that the exit facet reflectivity is insignificant. In the illustrated example of FIG. 7A, the random nanostructure statistics and the average depth of the diffuse boundary was optimized for the corresponding test wavelength $\lambda_1$.

FIG. 7B illustrates measurements from the same surfaces at a test wavelength $\lambda_2$ longer than wavelength $\lambda_1$ by a factor of 2.5. The incident wavelength $\lambda_2$ is one-half ($1/2$) the random structure depth and the features are less than $1/10$ of the wavelength $\lambda_2$. The optimized anti-reflection performance is affected, and the directional scatter, although with a flare smaller than the mirror's, is controlled. This performance is fundamentally different from a subwavelength grating structure or a thin-film layered surface that may contain inclusions or structural defects. In this respect, the random nano-structured diffuse boundary has unique performance characteristics.

Figure 8:
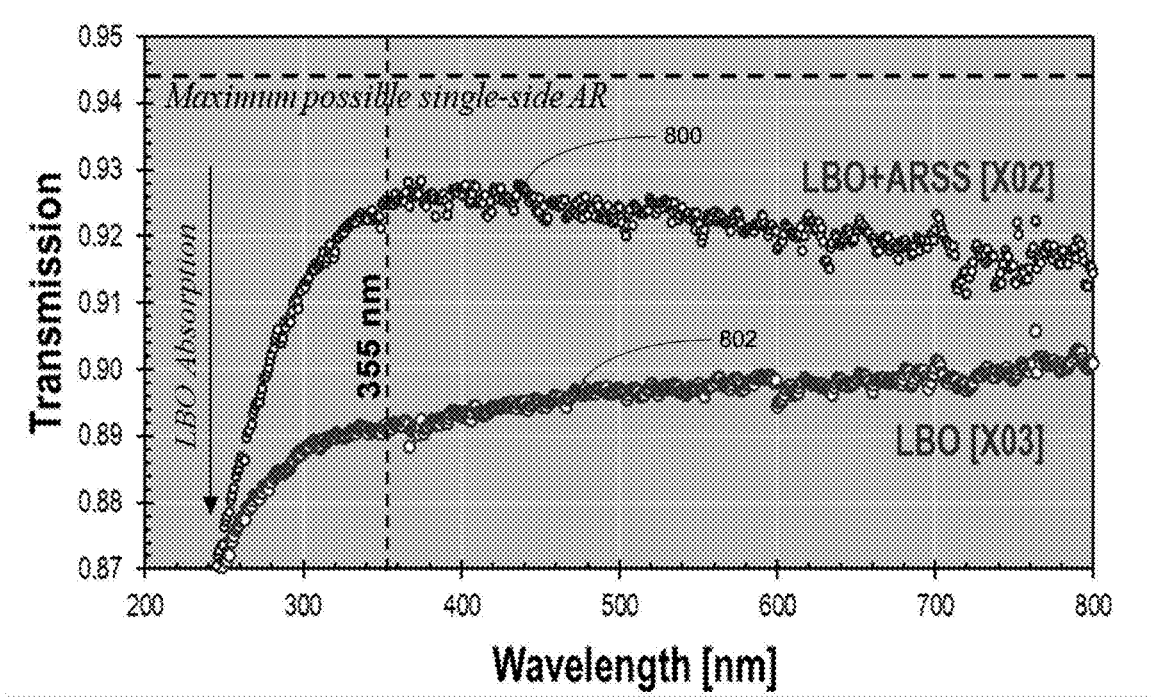
FIG. 8 is a graph showing transmission of light as a function of wavelength on a diffuse boundary nanostructured optical surface illustrating the anti-reflection characteristics of a diffuse boundary according to embodiments.

FIG. 8 is a graph showing transmission of light as a function of wavelength on a diffuse boundary nanostructured optical surface illustrating the anti-reflection characteristics of a diffuse boundary according to embodiments of the present disclosure. A sample LBO crystal was fabricated with a diffuse boundary DB nanostructured optical surface as described above with reference to FIGS. 1B-7B. The anti-reflection (AR) performance of this sample LBO crystal was tuned for operation in the UV range of the spectrum, near 355 nm wavelength. The AR performance of the diffuse boundary DB nanostructured optical surface is shown in FIG. 8. At 355 nm wavelength the transmission of the LBO crystal with the diffuse boundary nanostructured surface has increased by +3.1% as shown in the upper plot 800 relative to an LBO crystal without the diffuse boundary nanostructured surface. Although not expressly shown in FIG. 8, at 1064 nm wavelength the transmission of the LBO crystal with the diffuse boundary nanostructured surface increases by +1.3%. Transmission of the LBO crystal can be improved by selective variation of etching process parameters in forming the diffuse boundary nanostructured surface in order to increase the transmission towards a maximum possible value per surface, which is shown in FIG. 8 as the 94.5% (0.945) dashed line.

Figure 9:
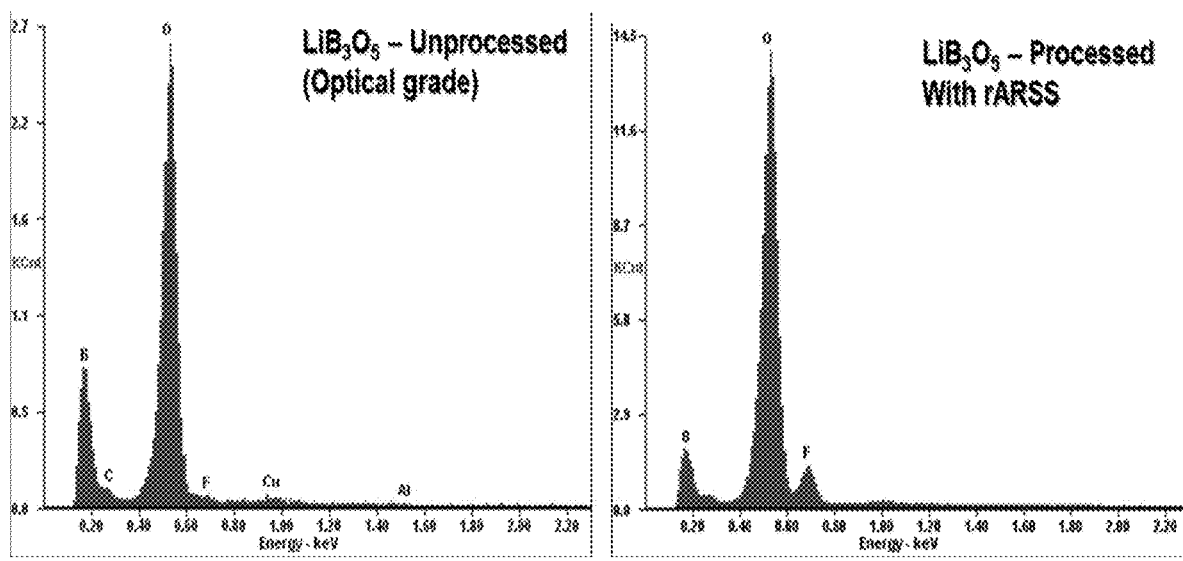
FIG. 9A is a graph of X-ray energy dispersive spectroscopic identification measurements illustrating the atomic composition of an LBO surface for an unprocessed optical grade LBO crystal.
FIG. 9B is a graph of X-ray energy dispersive spectroscopic identification measurements illustrating the atomic composition of an optical grade LBO crystal having an optical surface including randomly distributed nanostructures according to embodiments of the present disclosure.

FIGS. 9A and 9B are graphs of X-ray energy dispersive spectroscopic identification measurements illustrating the atomic composition of LBO surfaces for an unprocessed optical grade LBO crystal in FIG. 9A. FIG. 9B illustrates atomic composition of an optical grade LBO crystal having a structured optical surface including nanostructures according to embodiments of the present disclosure. Thus, FIG. 9A illustrates the atomic composition of several elements in the surface of a conventional optical grade LBO crystal. The identified elements are: B—Boron, C—Carbon (from human contamination), O—Oxygen, F—Fluorine, Cu—Copper (from the X-ray grounding connection), and Al—Aluminium (from the X-ray vacuum chamber holder). Lithium is not possible to detect with this method due to its low atomic number.

After the nanostructures have been formed in the surface of the LBO crystal according to embodiments of the present disclosure, the increase in Fluorine F in the surface is seen in graph of FIG. 9B. FIG. 9B illustrates that the processed surface including the nanostructures is rich in Fluorine F, with Fluorine having a peak that is comparable to the peak of Boron B. FIG. 9B also illustrates that the processed surface or diffuse boundary of the LBO crystal is relatively depleted of Boron B as seen by comparing the peak for Boron B in FIG. 9A to the peak in FIG. 9B. The diffuse boundary or processed surface of the LBO crystal in FIG. 9B is enriched with Lithium Fluoride LiF, resulting in additive transmission enhancement properties of the processed surface. As mentioned above, however, the presence of Lithium L in the processed surface cannot be detected through the illustrated X-ray energy dispersive spectroscopic identification method due to the low atomic number of Lithium.

Figure 10:
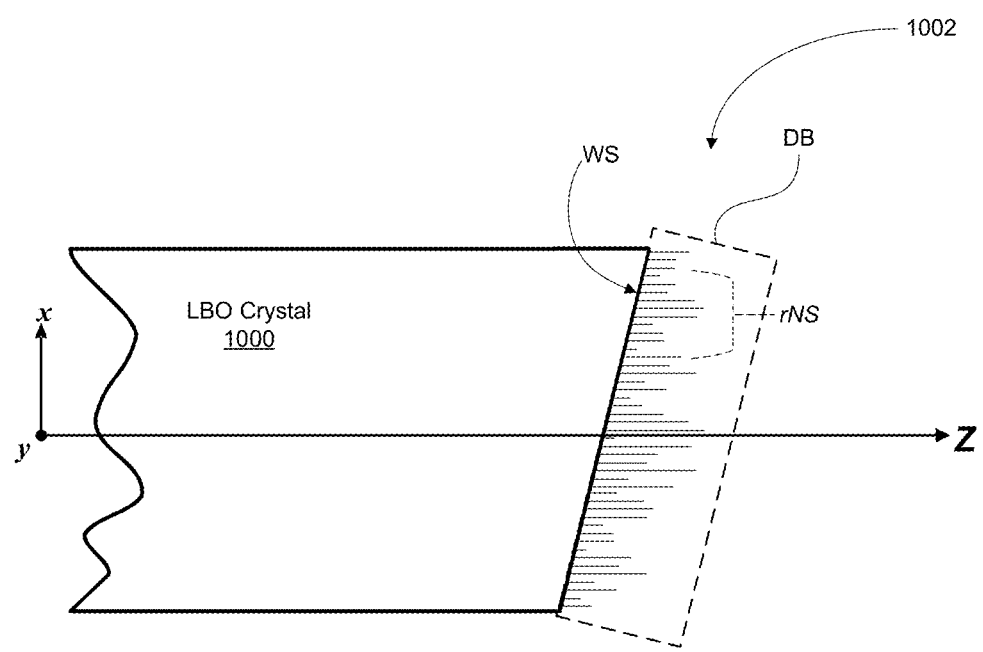
FIG. 10 is a cross-sectional view of an LBO crystal having an angled facet including random nanostructures according to an embodiment of the present disclosure.

FIG. 10 is a cross-sectional view of an LBO crystal 1000 having a wedged or angled facet 1002 including random nanostructures rNS according to another embodiment of the present disclosure. The facet 1002 has a wedged surface WS that is angled relative to the Z-axis so that the Z-axis is not orthogonal or normal to the plane of the wedged surface. This is in contrast to the embodiments of FIGS. 1B, 2 and 3 in which a planar surface of each facet rA, rB is orthogonal to axis along which the optical signals propagate, namely the Z-axis in the examples of FIGS. 1B, 2 and 3. The planar surface of each facet rA, rB in the embodiments of FIGS. 1B, 2 and 3 is in the XY-plane and the random nanostructures rNS extend orthogonal to this plane, namely parallel to the Z-axis. In contrast, in the embodiment of FIG. 10 the random nanostructures rNS extend at an acute angle relative to the wedged surface WS. In general, the random nanostructures rNS of facets forming diffuse boundaries DB according to embodiments of the present disclosure extend in a direction parallel to a desired direction of light entering or exiting the facet. Thus, as seen in the embodiment of FIG. 10 the random nanostructures rNS extend parallel to the Z-axis, which is the desired direction of the propagation of light exiting the facet 1002.

Figure 11:
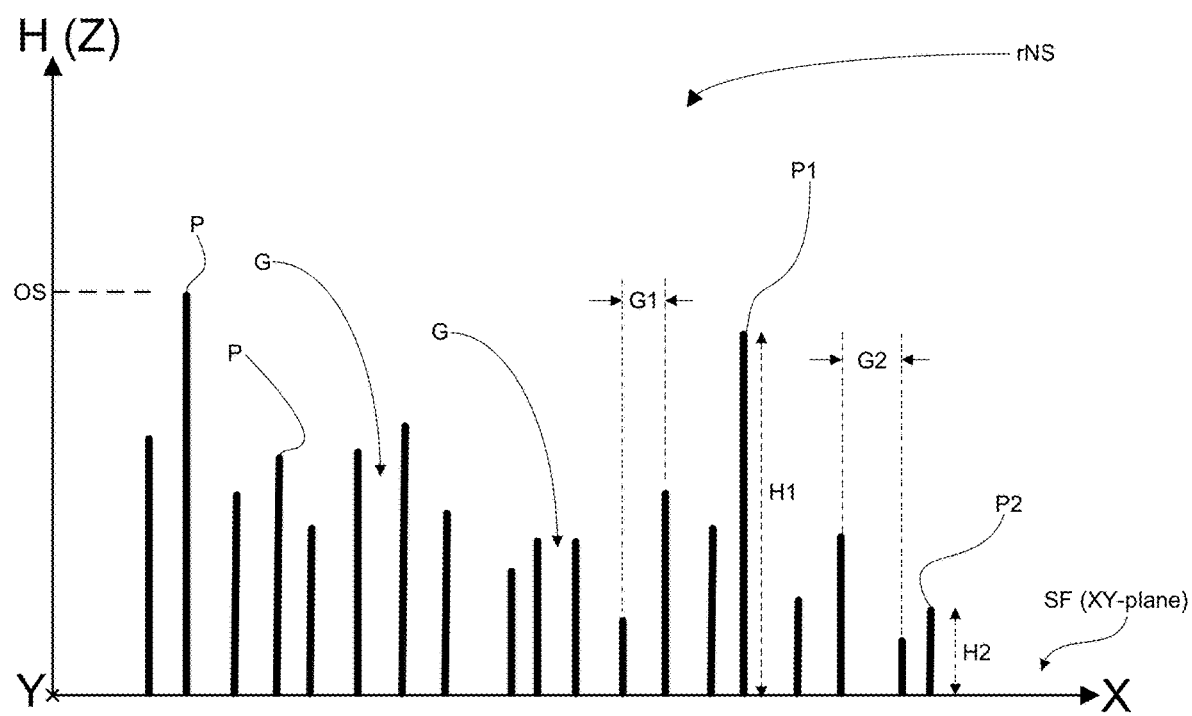
FIG. 11 is a simplified cross-sectional view of portion of a facet of an LBO crystal with randomly distributed nanostructures including pillars and gaps with average heights and spacings that are a function of the shortest and longest wavelengths of light to be propagated in the LBO crystal.

FIG. 11 is a simplified cross-sectional view of a portion of a facet of an LBO crystal with randomly distributed nanostructures rNS including pillars and gaps having average heights and spacings that are a function of the shortest and longest wavelengths of light to be propagated in the LBO crystal. The nanostructures rNS include a plurality of pillars P with voids or gaps G between the pillars. The pillars P are shown extending from a surface SF of the LBO crystal, each pillar having a corresponding height H. Only selected ones of the pillars P and gaps G are labelled in FIG. 11 to simplify the figure. One specific pillar P labeled a pillar P1 is shown having a height H1 while a second pillar is labeled as pillar P2 has a height P2. The heights H and gaps G of the pillars are random in some embodiments of the present disclosure, which is described as the facet having randomly distributed nanostructures rNS. In other embodiments, however, the heights H or gaps G, or both the heights and gaps, of the nanostructures may have periodic values instead of random values along the surface SF of the facet of the LBO crystal. Thus, in embodiments of the present disclosure the entry and exit facets of an LBO crystal may have either randomly distributed nanostructures rNS or periodically distributed nanostructures. In some embodiments, one facet of the LBO crystal includes randomly distributed nanostructures rNS while the other facet includes periodically distributed nanostructures.

In the simplified example of FIG. 11, the pillars P are shown as columns or rods of material corresponding to portions of the LBO crystal extending from the surface SF of the LBO crystal. The voids or gaps G correspond to the spaces between the pillars P in which the material of the LBO crystal has been removed to thereby form the pillars. The gaps G have different values as illustrated in FIG. 11 for gaps G1 and G2 between corresponding adjacent pairs of pillars P. As described above, a pillar has the geometrical shape of a truncated cone and may be randomly intersected at random heights by neighboring pillars due to the dense packing of the pillars. FIG. 11 is a simplified figure and illustrates the pillars P as being rod or column shaped. The pillars P are also shown as extending orthogonally from the surface SF, and thus where the surface SF is in the XY-plane as in the embodiment of FIGS. 1B, 2 and 3, the pillars have heights H extending parallel to the Z-axis. Where the surface SF of the LBO crystal is curved or wedged, the pillars P may not extend orthogonally from the surface as mentioned above in relation to the embodiment of FIG. 10. As previously mentioned, in general the heights H of each pillar P extends along a longitudinal axis that is parallel to a direction of light entering or exiting the facet including the nanostructures rNS.

Figure 12:
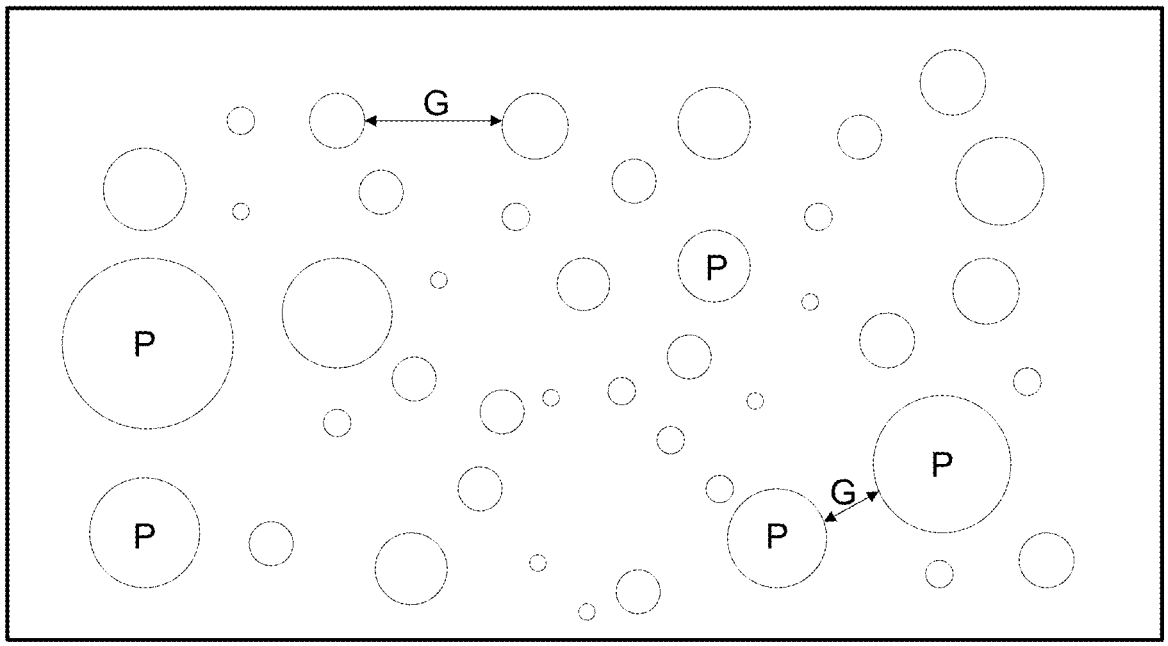
FIG. 12 is a top view of a portion of a facet of an LBO crystal including randomly distributed nanostructures such as the facet of FIG. 11.

FIG. 11 also illustrates an original surface OS of the LBO crystal. The original surface OS corresponds to the original planar surface or facet of the LBO crystal. This original facet or surface OS of the LBO crystal is then processed, such as through etching as will be described in more detail below, to remove portions of the material of the LBO crystal and thereby form the nanostructure pillars P and gaps G, as will be described in more detail below. Thus, the surface SF of the LBO crystal illustrated in FIG. 11 corresponds to the new or final surface of the LBO crystal after processing of the crystal to form the pillars P and gaps G collectively forming the random nanostructures rNS. FIG. 12 is a top view of a portion of a facet of an LBO crystal with randomly distributed nanostructures rNS including pillars P and gaps G such as the facet of FIG. 11. Several of the pillars P and gaps G are labelled in FIG. 12.

In the embodiments of FIGS. 11 and 12, the values of the pillars P and gaps G have average heights H and average spacings or cross-sections of the gaps G that are a function of the shortest and longest wavelengths $\lambda$ of light to be propagated in the LBO crystal. For example, in one embodiment the randomly distributed pillars P of an entry facet and an exit facet of an LBO crystal include randomly distributed nanostructures rNS having an average value of gaps G (i.e., spacing of pillars P) that is less than a shortest wavelength $\lambda 1$ of operation of the LBO crystal. For example, the gaps G may have an average value of 70% of the shortest wavelength $\lambda 1$. The average height H of the pillars P in this embodiment is greater than one half (i.e., 50%) of a longest wavelength $\lambda 2$ of operation.

Figure 13:
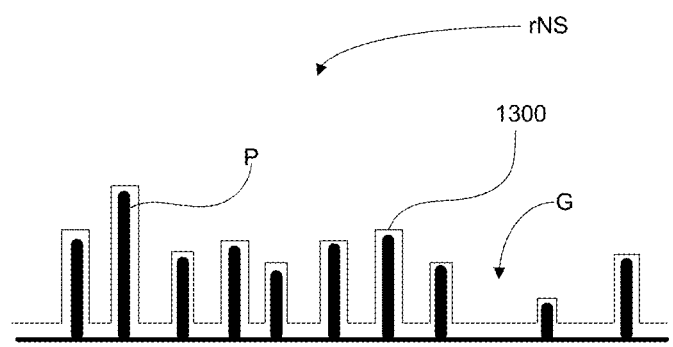
FIG. 13 is a top view illustrating a portion of a diffuse boundary optical surface having randomly distributed nanostructures with a conformal moisture barrier layer covering the randomly distributed nanostructures according to a further embodiment of the present disclosure.

FIG. 13 is a top view illustrating a portion of a diffuse boundary optical surface having randomly distributed nanostructures rNS with a conformal moisture barrier layer covering the randomly distributed nanostructures according to a further embodiment of the present disclosure. In this embodiment, the conformal moisture barrier layer 1300 is thin layer of a suitable hydroscopic material that functions as a moisture shield for the LBO crystal having the optical surface including the randomly distributed nanostructures rNS. The hydroscopic material is an optically inert material so that the optical characteristics of the diffuse boundary DB including the nanostructure pillars P and gaps G is not affected by the layer 1300. The layer 1300 is a very thin layer, being less than 50 nm in embodiments and deposited by atomic layer deposition. The layer 1300 is optically inert and thus has a matching refractive index as the material of the non-linear optical LBO crystal. The layer 1300 is aluminum oxide ($Al_2O_3$) or lithium fluoride (LiF) in some embodiments.

Figure 14:
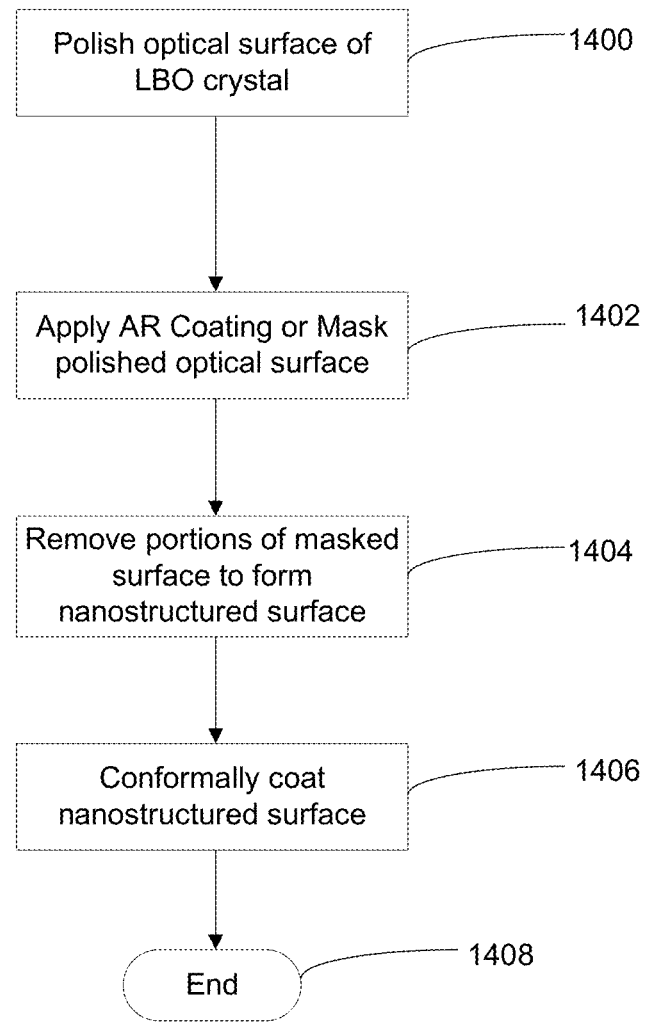
FIG. 14 is a flowchart illustrating a process of fabricating nanostructures in an optical surface of an LBO crystal according to embodiments of the present disclosure.

FIG. 14 is a flowchart illustrating a process of fabricating nanostructures in an optical surface of an LBO crystal according to embodiments of the present disclosure. The process begins in step 1400 and an optical surface of the LBO crystal is polished. From step 1400, the process goes to step 1402 and the polished optical surface either has an AR coating applied to the surface or a masking material is randomly applied to the polished and etched surface. The AR coating is applied in embodiments where nanostructures are not to be formed in the optical surface and this completes the processing of the optical surface in this situation.

Where nanostructures are to be formed in the optical service, a suitable masking material is randomly applied, such as through sputtering, to the polished optical surface. This masking material may, for example be formed from a suitable metal such as gold, aluminum and so on. Once the masking material has been applied to the polished optical surface in step 1402, the process proceeds to step 1404 and exposed portions of the masked optical surface are removed to form the gap and pillar nanostructures in the optical surface. The removal of the exposed portions of the LBO crystal on the optical surface may be performed in different manners, such as through plasma etching (e.g., with Argon) or chemical etching (e.g., fluorine-based compounds such as $CHF_3$, $C_4F_8$, $SF_6$ and so on). In one embodiment, the masked optical surface is etched through water vapor etching to form the desired pillar and gap nanostructures on the optical surface. In some embodiments, the step 1402 may be omitted and the optical surface of the LBO crystal is processed in step 1404 without prior masking of the surface in step 1402. Portions of the LBO material are removed from the optical surface to thereby form the nanostructured surface.

Any remaining portions of the masking material are thereafter removed after step 1404 and the process proceeds to step 1406 in which the nanostructured optical surface of the LBO crystal is conformally coated with a suitable hydroscopic material as previously described with reference to FIG. 13. Once the nanostructured surface is conformally coated in step 1406, the process proceeds to step 1408 and terminates. The nanostructured surface need not always be conformally coated and thus in some embodiments once the nanostructured surface is formed in step 1404 the process terminates.

Figure 15:
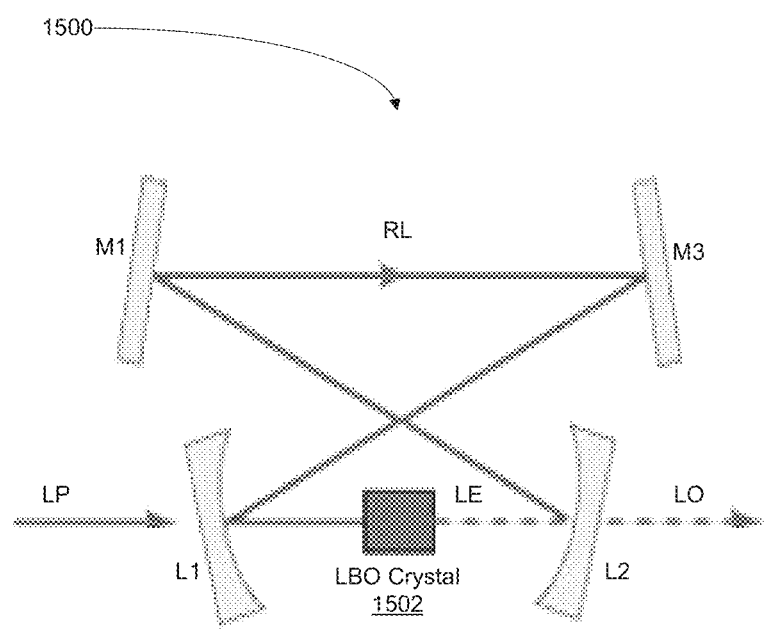
FIG. 15 is a functional block diagram of an electronic device including an LBO crystal with at least one facet including random nanostructures according to an embodiment.

FIG. 15 is a functional block diagram of an electronic device 1500 including an LBO crystal 1502 with at least one facet including random nanostructures according to embodiments of the present disclosure. In the example of FIG. 15, the electronic device is an optical parametric oscillator 1500 that oscillates at optical frequencies and converts an input laser pump signal LP into an output optical signal LO through the LBO crystal 1502 and a resonator structure formed by lenses L1, L2 and mirrors M1, M2 in the example of FIG. 15. In operation, an emitted light signal LE from the LBO crystal 1502 is fed back as a resonator light signal RL through the resonator structure to amplify the signal and generate the output optical signal LO, as will be understood by those skilled in the art. The LBO crystal 1502 may be utilized in other types of electronic devices as well, such as an optical parametric amplifier in which a laser light source is used to amplify signals typically with relatively long wavelengths with the help of the optical parametric amplification process implemented through the LBO crystal.

Figure 16:
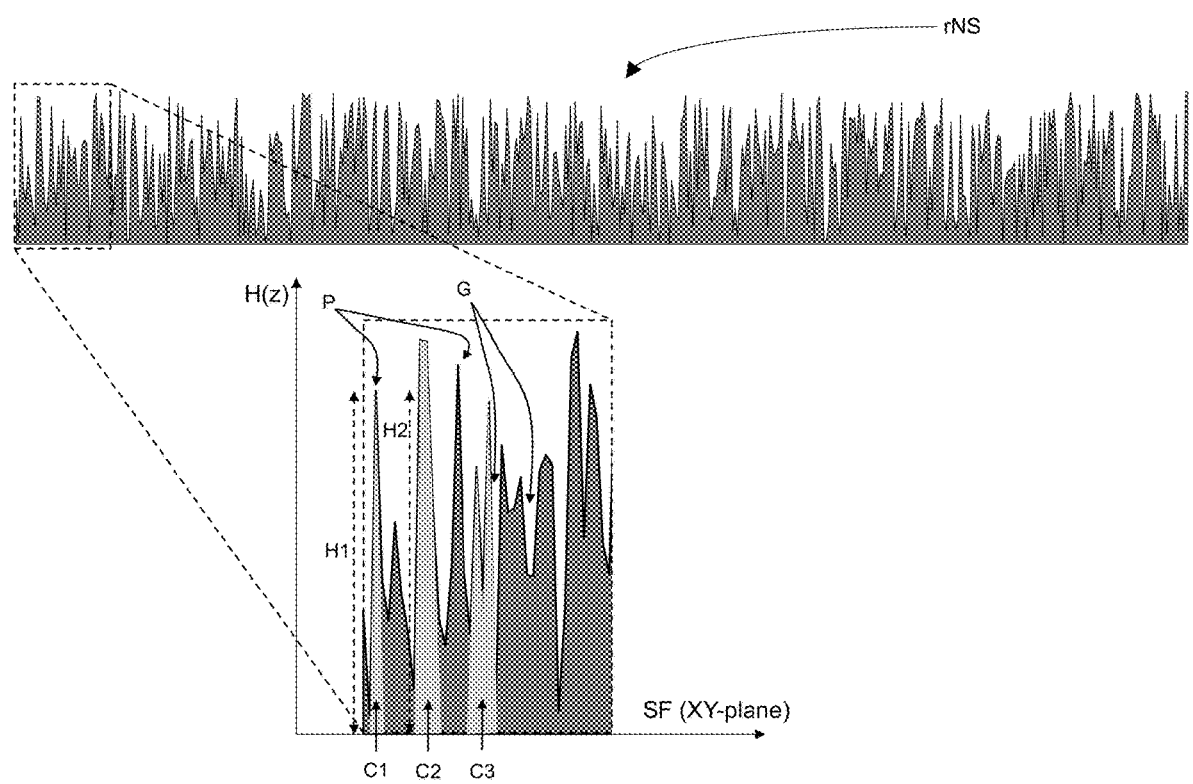
FIG. 16 is a more detailed cross-sectional view of portion of an optical surface of an LBO crystal showing randomly distributed nanostructures including pillars and gaps according to embodiments of the present disclosure.

FIG. 16 is a more detailed cross-sectional view illustrating a portion of an optical surface SF of an optical crystal, such as an LBO crystal, and showing randomly distributed nanostructures rNS including pillars P and gaps G on the optical surface according to embodiments of the present disclosure. The upper view of FIG. 16 is a cross-sectional view of the portion of the optical surface SF while the lower view is an exploded view illustrating pillars P gaps G in the leftmost portion of the upper view. FIG. 16 is a more detailed illustration compared to the simplified view of FIG. 11 and is a more detailed representation of a portion of a nanostructured surface according to embodiments of the present disclosure. As mentioned above and as illustrated in FIG. 16, a pillar P has the geometrical shape of a truncated cone and may be randomly intersected at random heights by neighboring pillars due to the dense packing of the pillars on the optical surface SF. Viewing this random structure of pillars P and gaps G from the top-down, as represented in a simplified manner for such a nanostructured optical surface SF in FIG. 12, one can see the circular cross sections of the pillars P at the respective intersected heights. In the top view the nanostructured optical surface SF accordingly appears as a collection of random circular pillars and gaps, each pillar and gap having a measurable cross-sectional diameter in the XY-plane. The lower view of FIG. 16 illustrates the truncated cone shape of pillars P in the cross-sectional view of this figure, namely in the XZ-plane. The heights H of the pillars P extend along the Z-axis. Several truncated cones C1, C2, C3 are labeled in the lower view of FIG. 16, with the cone C3, for example, illustrating the intersection of neighboring pillars P due to the dense packing of the pillars formed on the optical surface SF. The pillars P and gaps G may have average heights and spacings that are a function of the shortest and longest wavelengths of light to be propagated in the LBO crystal having the nanostructured optical surface SF.

FURTHER EXAMPLES

Embodiments of the present disclosure are directed to non-linear optical crystals, such as LBO crystals, along with devices, systems and methods including such LBO crystals.

In an embodiment, a non-linear optical crystal comprises: a first structured optical surface including distributed pillars and gaps having heights and cross sections to provide anti-reflection control and scatter control of first light incident on the first structured optical surface; and a second optical surface.

In some embodiments, the second optical surface comprises a second structured optical surface including distributed pillars and gaps having heights and cross sections to provide anti-reflection control and scatter control of second light incident on the second structured optical surface.

In some embodiments, the pillars and gaps are randomly distributed on the first structured optical surface and the second structured optical surface, and wherein pillars and gaps have random heights and random cross sections.

In some embodiments, the pillars and gaps are distributed on the first structured optical surface and the second structured optical surface having periodically varying heights and cross section values across the first optical surface and the second optical surface.

In some embodiments, the second optical surface includes an anti-reflective coating on the second optical surface.

In some embodiments, the non-linear optical crystal has an optical axis and wherein the first structured optical surface is a planar surface orthogonal to the optical axis.

In some embodiments, the first structured optical surface comprises a curved surface.

In some embodiments, the non-linear crystal has an optical axis and wherein the first structured optical surface is a wedged planar surface at an acute angle relative to the optical axis.

In some embodiments, the heights of the pillars extend along longitudinal axes of the pillars and the longitudinal axes are parallel to a direction of the first light incident on the first structured optical surface.

In some embodiments, the first light has a first wavelength in the infrared spectrum and the second light has a second wavelength in the visible spectrum.

In some embodiments, the pillars and gaps have average heights H and average cross-sections that are a function of a shortest wavelength and a longest wavelength of light to be propagated in the non-linear crystal.

In some embodiments, the gaps have an average value equal to 70% of the value of the shortest wavelength and the pillars have an average height equal to one half the longest wavelength.

In some embodiments, the gaps have an average value equal to 70% of the value of the shortest wavelength and the pillars have an average height equal to one half the longest wavelength.

In some embodiments the non-linear optical crystal further comprises a conformal moisture barrier layer covering the pillars and gaps of the first structured optical surface.

In some embodiments, the non-linear optical crystal is a Lithium triborate (LBO) crystal.

In some embodiments, the first structured optical surface comprises a diffuse boundary region depleted of Boron (B) and enriched with Lithium Fluoride (LiF).

In another embodiment, an LBO crystal comprises: a first structured optical surface including a plurality of randomly distributed nanostructures including pillars having heights and gaps having cross sections, the gaps positioned between the pillars and the cross sections of the gaps configured to provide a gradient index profile to provide anti-reflection control and the heights of pillars configured to provide scatter control for light incident upon first structured optical surface.

In some embodiments, the first structured optical surface is depleted of Boron (B) and enriched with Lithium Fluoride (LiF).

In some embodiments, the light is incident upon the first structured optical surface in a first direction, and wherein pillars are arranged parallel to the first direction.

In another embodiment, a method of processing a non-linear optical crystal comprises: polishing a first optical surface of the non-linear crystal; masking the first optical surface; and removing portions of the masked optical surface to form a nanostructured optical surface including a plurality of pillar and gaps.

In some embodiments, the method further comprises conformally coating the nanostructured optical surface with a moisture barrier layer.

In some embodiments, the non-linear optical crystal is a Lithium triborate (LBO) crystal.

In some embodiments, masking the first optical surface comprises randomly masking the first optical surface.

In some embodiments, randomly masking the first optical surface comprises randomly sputtering a masking material onto the first optical surface.

In the present description, for purposes of explanation, numerous examples and specific details have been set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-linear optical crystal, comprising:
   a first structured optical surface including distributed pillars and gaps having heights and cross sections to provide anti-reflection control and scatter control of first light incident on the first structured optical surface; and
   a second optical surface,
   wherein the non-linear optical crystal is a Lithium triborate (LBO) crystal, and wherein the first structured optical surface is depleted of Boron (B).

2. The non-linear optical crystal of claim 1, wherein the second optical surface comprises a second structured optical surface including distributed pillars and gaps having heights and cross sections to provide anti-reflection control and scatter control of second light incident on the second structured optical surface.

3. The non-linear optical crystal of claim 2, wherein the pillars and gaps are randomly distributed on the first structured optical surface and the second structured optical surface, and wherein pillars and gaps have random heights and random cross sections.

4. The non-linear optical crystal of claim 2, wherein the pillars and gaps distributed on the first structured optical surface and the second structured optical surface have periodically varying heights and cross section values across the first optical surface and the second optical surface.

5. The non-linear optical crystal of claim 1, wherein the second optical surface includes an anti-reflective coating on the second optical surface.

6. The non-linear optical crystal of claim 1, wherein the non-linear optical crystal has an optical axis and wherein the first structured optical surface is a planar surface orthogonal to the optical axis.

7. The non-linear optical crystal of claim 1, wherein the first structured optical surface comprises a curved surface.

8. The non-linear optical crystal of claim 1, wherein the non-linear crystal has an optical axis and wherein the first structured optical surface is a wedged planar surface at an acute angle relative to the optical axis.

9. The non-linear optical crystal of claim 1, wherein the heights of the pillars extend along longitudinal axes of the pillars and the longitudinal axes are parallel to a direction of the first light incident on the first structured optical surface.

10. The non-linear optical crystal of claim 1, wherein the first light has a first wavelength in the infrared spectrum and a second light generated in the non-linear optical crystal in response to the first light has a second wavelength in the visible spectrum.

11. The non-linear optical crystal of claim 1, wherein the pillars and gaps are configured to have average heights and average cross-sections that are a function of a shortest wavelength and a longest wavelength of light to be propagated in the non-linear crystal.

12. The non-linear optical crystal of claim 11, wherein the gaps have an average value equal to 70% of the value of the shortest wavelength and the pillars have an average height equal to one half the longest wavelength.

13. The non-linear optical crystal of claim 1 further comprising a conformal moisture barrier layer covering the pillars and gaps of the first structured optical surface.

14. The non-linear optical crystal of claim 1, wherein the first structured optical surface is enriched with Lithium Fluoride (LiF).

15. An LBO crystal, comprising:
a first structured optical surface including a plurality of randomly distributed nanostructures including pillars having heights and gaps having cross sections, the gaps positioned between the pillars and the cross sections of the gaps configured to provide a gradient index profile to provide anti-reflection control and the heights of pillars configured to provide scatter control for light incident upon first structured optical surface, wherein the first structured optical surface is depleted of Boron (B).

16. The LBO crystal of claim 15, wherein the first structured optical surface is enriched with Lithium Fluoride (LiF).

17. A non-linear optical crystal, comprising:
a first structured optical surface including distributed pillars and gaps having heights and cross sections to provide anti-reflection control and scatter control of first light incident on the first structured optical surface;
a second optical surface; and
a conformal moisture barrier layer covering the pillars and gaps of the first structured optical surface.

18. The non-linear optical crystal of claim 17, wherein the second optical surface comprises a second structured optical surface including distributed pillars and gaps.

19. The non-linear optical crystal of claim 18, wherein the pillars and gaps are randomly distributed on the first structured optical surface and the second structured optical surface, and wherein pillars and gaps have random heights and random cross sections.

20. The non-linear optical crystal of claim 18, wherein the pillars and gaps distributed on the first structured optical surface and the second structured optical surface have periodically varying heights and cross section values across the first optical surface and the second optical surface.

21. The non-linear optical crystal of claim 17, wherein the second optical surface includes an anti-reflective coating on the second optical surface.

22. The non-linear optical crystal of claim 17, wherein the non-linear optical crystal has an optical axis and wherein the first structured optical surface is a planar surface orthogonal to the optical axis.

23. The non-linear optical crystal of claim 17, wherein the first structured optical surface comprises a curved surface.

24. The non-linear optical crystal of claim 17, wherein the non-linear crystal has an optical axis and wherein the first structured optical surface is a wedged planar surface at an acute angle relative to the optical axis.

25. The non-linear optical crystal of claim 17, wherein the heights of the pillars extend along longitudinal axes of the pillars and the longitudinal axes are parallel to a direction of the first light incident on the first structured optical surface.

26. The non-linear optical crystal of claim 17, wherein the first light has a first wavelength in the infrared spectrum and a second light generated in the non-linear optical crystal in response to the first light has a second wavelength in the visible spectrum.

27. The non-linear optical crystal of claim 17, wherein the pillars and gaps have average heights and average cross-sections that are a function of a shortest wavelength and a longest wavelength of light to be propagated in the non-linear crystal.

28. The non-linear optical crystal of claim 27, wherein the gaps have an average value equal to 70% of the value of the shortest wavelength and the pillars have an average height equal to one half the longest wavelength.

29. The non-linear optical crystal of claim 17, wherein the non-linear optical crystal is a Lithium triborate (LBO) crystal.

30. The non-linear optical crystal of claim 17, wherein the conformal moisture barrier layer shields the first structured optical surface from moisture.

31. The non-linear optical crystal of claim 17, wherein the conformal moisture barrier layer has a refractive index matching the non-linear optical crystal.

32. The non-linear optical crystal of claim 17, wherein the conformal moisture barrier layer comprises one of aluminum oxide or lithium fluoride.

* * * * *